US008191085B2

(12) United States Patent
Moyer

(10) Patent No.: US 8,191,085 B2
(45) Date of Patent: May 29, 2012

(54) METHOD AND APPARATUS FOR LOADING OR STORING MULTIPLE REGISTERS IN A DATA PROCESSING SYSTEM

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 975 days.

(21) Appl. No.: 11/467,988

(22) Filed: Aug. 29, 2006

(65) Prior Publication Data

US 2008/0126744 A1 May 29, 2008

(51) Int. Cl.
G06F 9/46 (2006.01)
G06F 15/76 (2006.01)
G06F 7/38 (2006.01)
(52) U.S. Cl. .......................... 719/328; 712/24; 712/224
(58) Field of Classification Search ........................ None
See application file for complete search history.

(56) References Cited

U.S. PATENT DOCUMENTS

| 5,416,911 | A | 5/1995 | Dinkjian et al. | |
|---|---|---|---|---|
| 5,428,779 | A | 6/1995 | Allegrucci et al. | |
| 5,889,973 | A | 3/1999 | Moyer | |
| 6,119,206 | A * | 9/2000 | Tatkar et al. | 711/147 |
| 6,378,022 | B1 | 4/2002 | Moyer | |
| 2003/0046516 | A1 * | 3/2003 | Cho | 712/209 |
| 2004/0055003 | A1 * | 3/2004 | Sundaram et al. | 718/108 |
| 2006/0004996 | A1 * | 1/2006 | Gonion | 712/241 |
| 2007/0277130 | A1 * | 11/2007 | Lavelle | 716/4 |

OTHER PUBLICATIONS

Mac OS X ABI Function Call Guide, Dec. 6, 2005, Apple Computer, Inc., pp. 1-57.*
Sony, SPU Application Binary Interface Specification, Version 1.4, Oct. 20, 2005, pp. 1-38.*
Sony, Synergistic Processor Unit Instruciton Set Architecture, Aug. 1, 2005, Version 1.0, pp. 1-257.*
INFINEON; "Tricore 2 32-bit Processor Architecture Manual"; Version 1.1 Jun. 2003, pp. 32-87, 387-388, and 393.
IBM Corporation; "Book E: Enhanced PowerPC Architecture"; Version 0.99, Third Edition, Mar. 15, 2001 USA, pp. 126-127.
Freescale Semiconductor, Inc.; "ColdFire Family Programmer's Reference Manual"; Document No. CFPRM, Rev. 3, Mar. 2005, USA, pp. 1-11.

* cited by examiner

Primary Examiner — Andy Ho
Assistant Examiner — Tuan Dao
(74) Attorney, Agent, or Firm — Joanna G. Chiu; Susan C. Hill

(57) ABSTRACT

A method for operating a data processing system includes providing an application binary interface (ABI) which determines a set of non-contiguous volatile registers and a set of non-volatile registers. The set of non-contiguous volatile registers includes a plurality of general purpose registers (GPRs) and a plurality of special purpose registers (SPRs). The method includes providing less than three instructions which collectively load or store all of the set of non-contiguous volatile registers determined by the ABI. A system includes a set of volatile registers including a plurality of volatile GPRs, a plurality of volatile supervisor SPRs, and a plurality of volatile user SPRs, and execution circuitry for executing a first instruction that loads or stores the plurality of volatile supervisor SPRs, for executing a second instruction that loads or stores the plurality of volatile GPRs, and for executing a third instruction that loads or stores the plurality of volatile user SPRs.

14 Claims, 4 Drawing Sheets

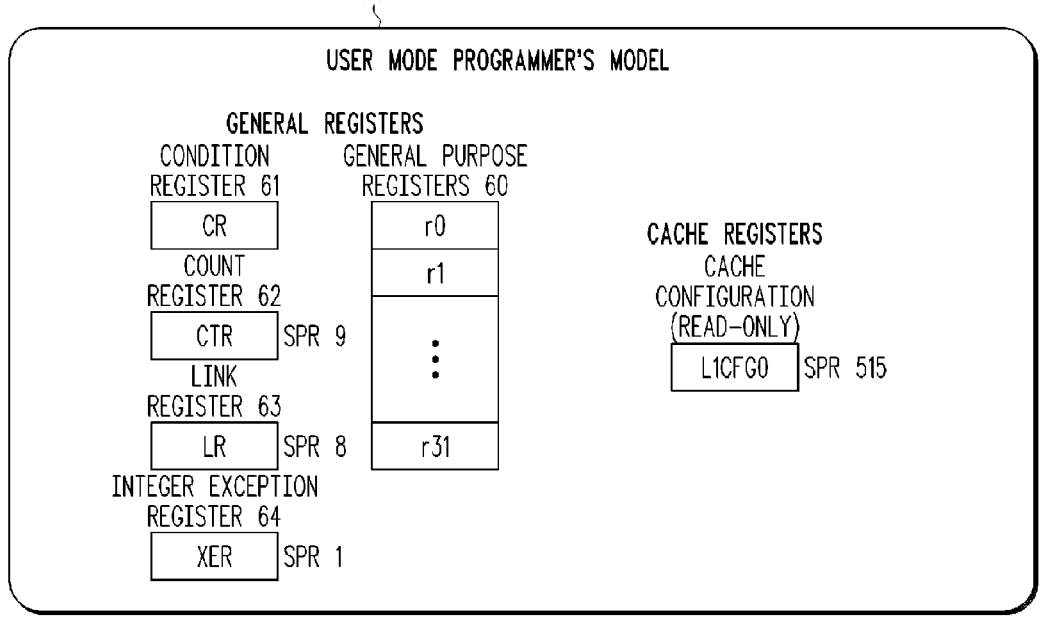

FIG. 3

| REGISTER | VOLATILITY | USAGE NAME |
|---|---|---|
| r0 | VOLATILE | REGISTER WHICH MAY BE MODIFIED DURING FUNCTION LINKAGE |
| r1 | DEDICATED | STACK FRAME POINTER, ALWAYS VALID |
| r2 | DEDICATED | SMALL DATA AREA 2 POINTER REGISTER |
| r3-r4 | VOLATILE | REGISTERS USED FOR PARAMETER PASSING AND RETURN VALUES |
| r5-r10 | VOLATILE | REGISTERS USED FOR PARAMETER PASSING |
| r11-r12 | VOLATILE | REGISTERS THAT MAY BE MODIFIED DURING FUNCTION LINKAGE |
| r13 | DEDICATED | SMALL DATA AREA POINTER REGISTER |
| r14-r31 | NONVOLATILE | REGISTERS USED FOR LOCAL VARIABLES |
| CR0-CR1 | VOLATILE | CONDITION REGISTER FIELDS, EACH 4 BITS WIDE |
| CR2-CR4 | NONVOLATILE | CONDITION REGISTER FIELDS, EACH 4 BITS WIDE |
| CR5-CR7 | VOLATILE | CONDITION REGISTER FIELDS, EACH 4 BITS WIDE |
| LR | VOLATILE | LINK REGISTER |
| CTR | VOLATILE | COUNT REGISTER |
| XER | VOLATILE | INTERGER EXCEPTION REGISTER |

FIG. 4

```
stmsrrw[u]      -8(r1)
stmvgprw[u]     -44(r1)
stmvsprw[u]     -16(r1)

⋮ lmvsprw         (r1)
lmvgprw[u]      16(r1)
lmsrrw[u]       44(r1)
addi            #8, r1
```

FIG. 5

METHOD AND APPARATUS FOR LOADING OR STORING MULTIPLE REGISTERS IN A DATA PROCESSING SYSTEM

FIELD OF THE INVENTION

This invention relates generally to data processing, and more specifically, to loading or storing multiple registers in a data processing system.

RELATED ART

In a data processing system, time is spent saving and restoring processor states when handling interrupts. For example, when an interrupt is received, the current state of the processor, including the contents of special purpose and general purpose registers, needs to be saved, and then restored upon returning to normal program execution. The more time needed to save and restore the current state for interrupt handling increases the interrupt latency. Typically, it is desirable to reduce interrupt latency within a data processing system. Also, if the time needed to save and restore the current state for interrupt handling becomes too great, other higher priority interrupts which occur during these times may be missed, resulting in a slower or less reliable system. Furthermore, these issues may be of even more concern in real-time embedded system.

BRIEF DESCRIPTION OF THE DRAWINGS

The present invention is illustrated by way of example and is not limited by the accompanying figures, in which like references indicate similar elements.

FIG. 3 illustrates an example of a user mode programmer's model for the processor of FIG. 1, in accordance with one embodiment of the present invention.

FIG. 4 illustrates a definition of processor registers for the processor of FIG. 1 as defined by the Application Binary Interface (ABI) for the processor of FIG. 1, in accordance with one embodiment of the present invention.

FIG. 5 illustrates a code segment that may be executed by the processor of FIG. 1, in accordance with one embodiment of the present invention.

Figure 1:
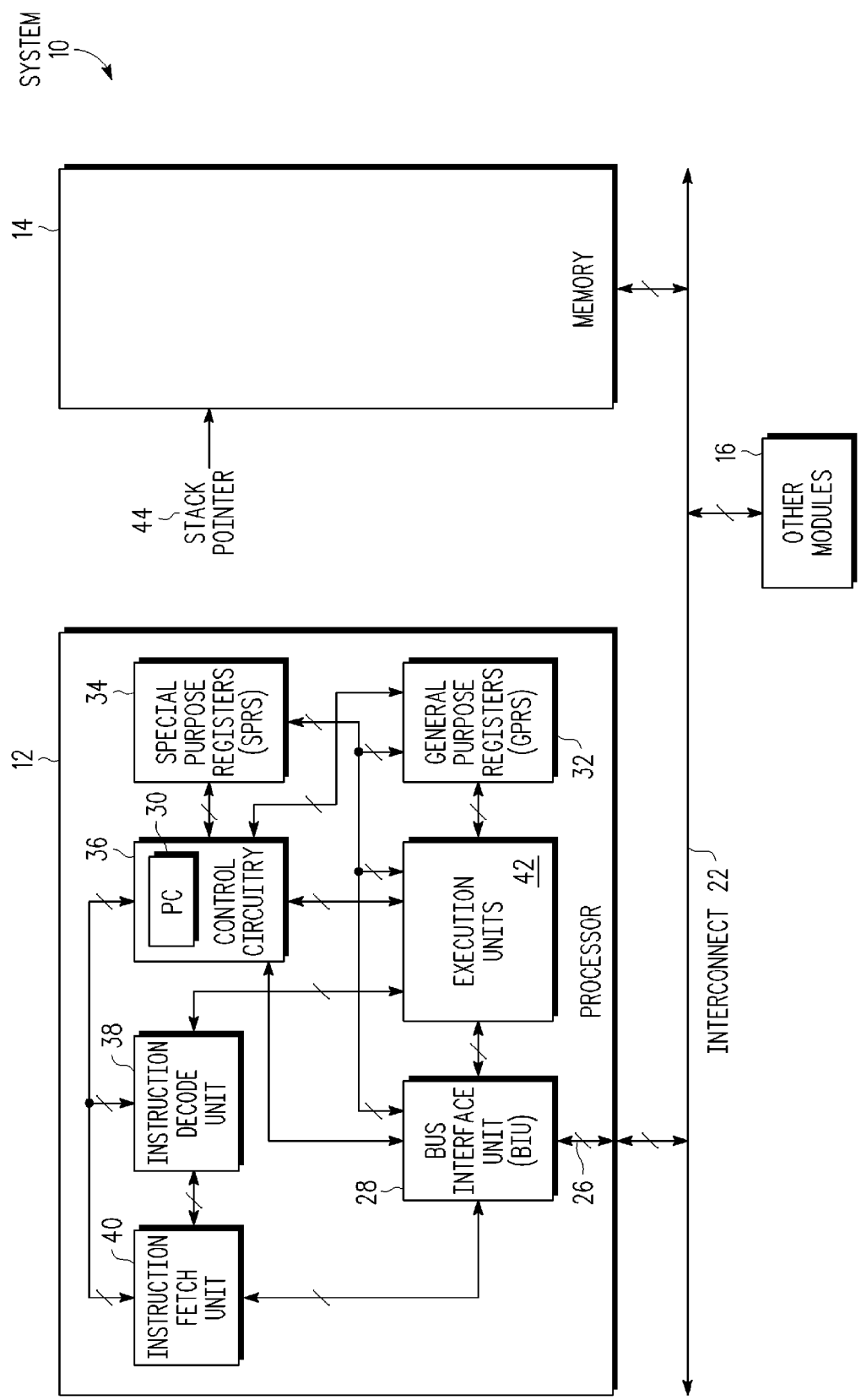
FIG. 1 illustrates a block diagram of a data processing system, including a processor and a memory, in accordance with one embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Therefore, each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Also, as used herein, a word indicates 32-bits (i.e. 4 bytes, where 1 byte equals 8 bits) and a double-word indicates 64-bits. However, in alternate embodiments, note that a word can be defined as other sizes, such as, for example, 16-bits (i.e. 2 bytes) or 64-bits (i.e. 8 bytes). A double-word would then be defined as 32-bits or 128-bits, respectively.

In one embodiment, upon receiving an interrupt, it is desirable to store state information, including the contents of various general purpose registers (GPRs) and special purpose registers (SPRs). For example, various different subsets of the GPRs and SPRs may need to be saved and restored. Furthermore, these subsets may be non-contiguous subsets of registers. Therefore, various store and load instructions will be discussed herein which allow for the saving and loading of multiple registers (GPRs and/or SPRs, contiguous or non-contiguous), where each instruction is capable of saving or loading the multiple registers to or from the stack.

FIG. 1 illustrates a data processing system 10 in accordance with one embodiment of the present invention. System 10 includes a processor 12, a memory 14, and other modules 16, all bidirectionally coupled with each other via a system interconnect 22. Processor 12 may be any type of processor, such as, for example, a microprocessor, microcontroller, digital signal processor, etc. Memory 14 can be any type of memory that can be read from and written to, such as, for example, a random access memory (RAM), a non-volatile memory, magneto-resistive RAM (MRAM), etc. Other modules 16 may include any number and type of peripherals and/or input/outputs (I/Os) as needed within data processing system 10. In an alternate embodiment, other modules 16 may not be present. In one embodiment, all of data processing system 10 may be located on a single integrated circuit. Alternatively, data processing system 10 may be formed on any number of integrated circuits.

Processor 12 includes an instruction fetch unit 40, an instruction decode unit 38, a control unit 36, special purpose registers (SPRs) 34, a bus interface unit (BIU) 28, execution units 42, and general purpose registers (GPRs) 32. Control 36 is bidirectionally coupled to instruction fetch unit 40, instruction decode unit 38, SPRs 34, GPRs 32, execution units 42, and BIU 28. BIU 28 is bidirectionally coupled to instruction fetch unit 40, execution units 42, SPRs 34, and GPRs 32. Instruction decode unit 38 is bidirectionally coupled to instruction fetch unit 40 and execution units 42, and execution units 42 are bidirectionally coupled to SPRs 34.

In the illustrated embodiment, instruction fetch unit 26 receives processor instructions via conductors 26 and interconnect 22 from memory locations (such as from memory 14 or from another memory coupled to interconnect 22). In an alternate embodiment, instruction fetch unit 40 may receive processor instructions from a cache, if present within processor 12. Instruction fetch unit 40 provides the fetched instructions to instruction decode unit 38. Instruction decode unit 38 decodes the received instruction, and execution units 42 execute the decoded instructions, accessing SPRs 34, GPRs 32, and memory 14 as needed. Control circuitry 36 provides information to and from each of the instruction fetch unit 40, instruction decode unit 38, SPRs 34, GPRs 32, execution units 42, and BIU 28 as needed for processor 12 to execute processor instructions. Also, control circuitry 36 includes a storage location 30 which stores the program counter (PC). (Note that, in one embodiment, storage location 30 may be referred to as a PC register.) Data is received by and provided from processor 12 via BIU 26, as needed during the execution of processor instructions. In one embodiment, all or portions of execution units 42 may be referred to as execution circuitry. Alternatively, the execution circuitry may also include all or portions of instruction fetch unit 40, instruction decode unit 38, and control circuitry 36, or combinations thereof. Operation of processor 12 is known in the art, and therefore, further details will only be provided, as needed, to describe operation of the processor instructions discussed herein.

Figure 2:
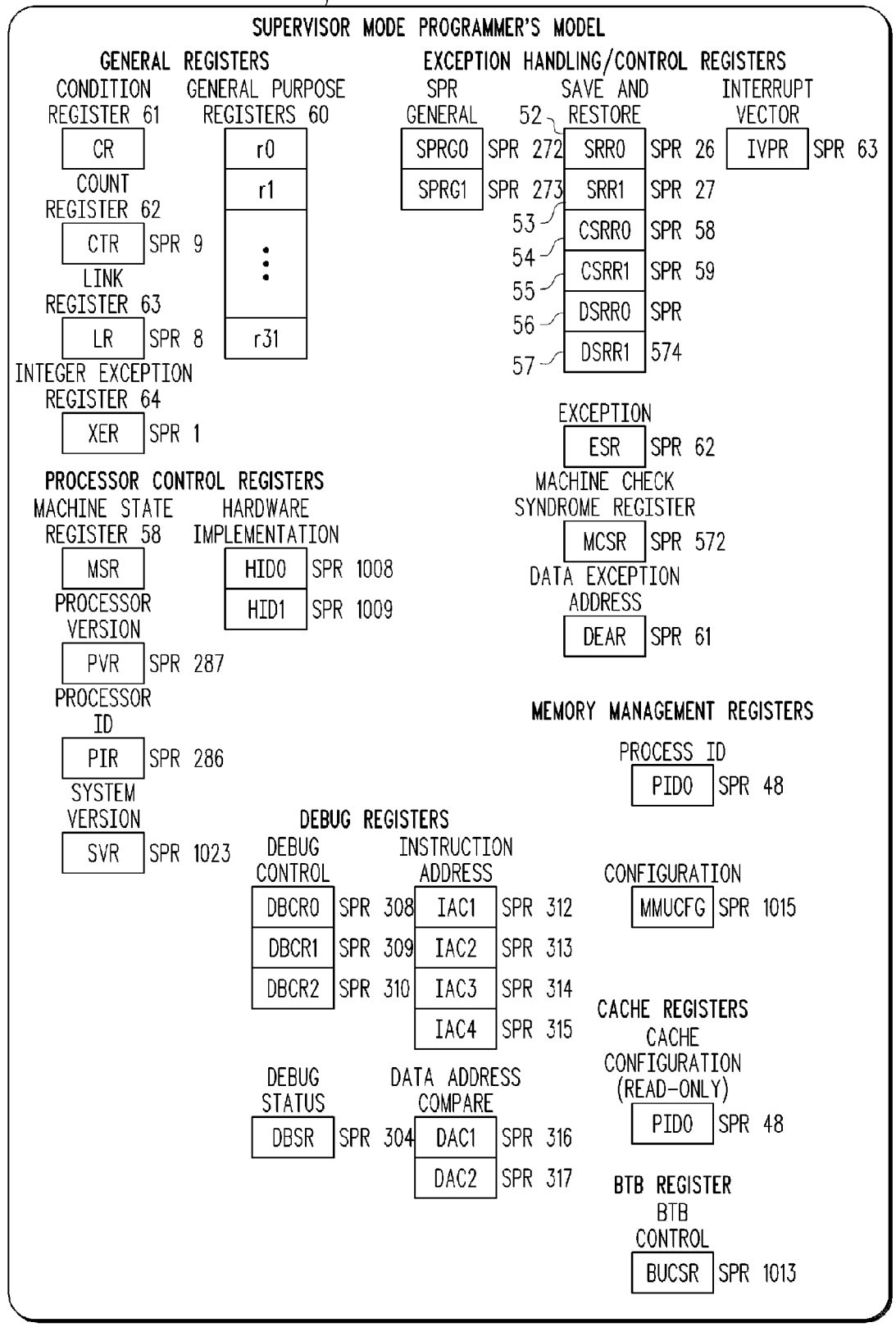
FIG. 2 illustrates an example of a supervisor mode programmer's model for the processor of FIG. 1, in accordance with one embodiment of the present invention.

FIG. 2 illustrates a supervisor mode programmer's model 50 for processor 12, in accordance with one embodiment of the present invention. The supervisor mode programmer's model 50 defines those general purpose registers (GPRs) and special purpose registers (SPRs) that are accessible during operation in supervisor mode. Supervisor mode programmer's model 50 includes general purpose registers 60, which includes contiguous general purpose registers r0, r1, . . . , r31. That is, note that GPRs 60 are contiguously labeled r0 to r31. In alternate embodiments, GPRs 60 may include any number of contiguous GPRs labeled, for example, r0, r1, . . . rN, where N can be any integer. Also, in alternate embodiments, GPRs 60 may be contiguously labeled using a different labeling convention, such as, for example, r1, r2, . . . , r32. Note that GPRs may be used to store operands for processor instructions which perform logical, arithmetic, or compare functions. That is, processor instructions may be used to perform logical, arithmetic, or compare functions on the contents of the GPRs, where the processor instructions may directly specify one or more of the GPRs to provide the operands of the processor instructions. Note that each of the GPRs are directly addressable within processor instructions by their label, i.e. their register number.

All the other registers defined in supervisor mode programmer's model 50 are SPRs. For example, some of the SPRs include condition register (CR) 61, count register (CTR) 62, link register (LR) 63, and integer exception register (XER) 64. In one embodiment, CR 61 stores resulting conditions of processor operations (such as arithmetic, logical, or compare functions) and indicates various resulting conditions, such as, for example, when a value or result is equal to zero, when a value or result is negative, or when an overflow or carry is indicated. Alternatively, other conditions may be represented by CR 61 instead of or in addition to these, such as, for example, when one value is greater than another or less than another. In one embodiment, CTR 62 is used as a loop counter, LR 63 is used to store a return program counter address for returning from a subroutine call, and XER 64 is used to store integer exception status information. Other SPRs within supervisor mode programmer's model 50 include machine state register (MSR) 58, and save and restore registers such as SRR0 52 and SRR1 53, CSRR0 54, CSRR1 55, DSRR0 56, and DSRR1 57. In one embodiment, MSR 58 includes various mode control fields, status fields, interrupt enable fields, address space control fields, etc. In one embodiment, when handling an interrupt, hardware stores the PC value (from, e.g., a PC register) into SRR0 52 and the contents of MSR 58 into SRR1 53. CSSR0 54 an CSRR1 55 refer to critical interrupt save and restore registers which store the MSR and PC values when a critical interrupt occurs. DSSR0 56 and DSRR1 57 refer to debug save and restore registers which store the MSR and PC values when a debug interrupt occurs. These save/restore registers are used as holding registers to store the extant values of the MSR and current PC value when an interrupt occurs so that upon completion of the interrupt handler, values saved within the respective set of registers can be restored back to the MSR and PC to effect a return from interrupt. Multiple sets of save restore registers are typically provided to allow for multiple priorities of interrupts which can be nested.

SPRs are used for specific functions and are typically not explicitly identified by processor instructions as storing operands for the computational or memory transfer instructions, unlike GPRs. Instead, facilities are typically only provided to transfer an SPR to or from a GPR. After the transfer to a GPR, normal computational instructions or load/store instructions may then operate on or transfer the value originally contained in the SPR. Note that SPRs are not GPRs; that is, SPRs and GPRs are mutually exclusive.

FIG. 3 illustrates a user mode programmer's model 70 for processor 12, in accordance with one embodiment of the present invention. The user mode programmer's model 70 defines those general purpose registers (GPRs) and special purpose registers (SPRs) that are accessible during operation in user mode. User mode programmer's model 70 includes general purpose registers 60, and SPRs including CR 61, CTR 62, LR 63, and XER 64, all of which have been described above. Note that user mode programmer's model 70 also includes a cache configuration SPR (which is also present in supervisor mode programmer's model 50).

Note that in one embodiment, the GPRs defined by supervisor mode programmer's model 50 and user mode programmer's model 70 are located within GPRs 32 of processor 12, and the SPRs defined by supervisor mode programmer's model 50 and user mode programmer's model 70 are located within SPRs 34 of processor 12. However, in alternate embodiments, they can be located elsewhere within processor 12 or within data processing system 10. Also, note that in alternate embodiments, supervisor mode programmer's model 50 and user mode programmer's model 70 may define more or less GPRs and/or SPRs.

FIG. 4 illustrates a register definition of GPRs 60 and SPRs 61-64 according to one embodiment of the ABI for processor 12. Generally, the ABI defines the low-level interface between an application program and the operating system, between an application and its libraries, or between component parts of the application. Conforming to an ABI allows compiled object code to function without changes on any system using a compatible ABI, by defining a function calling convention, register usage conventions, and other interoperability details. For example, note that the ABI defines which of GPRs 60 and SPRs 61-64 are volatile registers, dedicated registers, or non-volatile registers, and also defines a usage for each register. In one embodiment, volatile registers refer to those registers which are not saved and restored across function call boundaries, while non-volatile registers are preserved across function call boundaries. Therefore, if a function wishes to use a non-volatile register, the function must save the contents of the non-volatile register prior to using the non-volatile register and then restore the contents of the non-volatile register when finished. Also, note that a portion of a register can be volatile, while another portion of the same register can be non-volatile. For example, referring to CR 61, fields CR0, CR1, and CR5-CR7 are volatile fields of SPR CR 61, while fields CR2-CR4 are non-volatile fields of SPR CR 61. In one embodiment, dedicated registers are those which are always dedicated to a particular function. Note that, in the illustrated embodiment, the ABI of processor 12 defines non-contiguous GPRs r0 and r3-r12 as volatile registers. Furthermore, SPRs LR 63, CTR 62, XER 64, and fields CR0, CR1, and CR5-CR7 of SPR CR 61 are also defined as volatile registers (or volatile portions of a register).

The illustrated ABI register definitions of FIG. 4 also include a usage description (i.e. a usage name) for each register listed. For example, note that GPR r1 is defined as the stack frame pointer (which may also be referred to as the stack pointer). Note that in alternate embodiments, the ABI may differ, where the usage names for each register may differ, and thus the designations of volatile, non-volatile, or dedicated may also differ. Also, the registers (such as the SPRs) defined by the ABI may differ in different embodiments. For example, in the illustrated embodiment, note that SPRs CR 61, LR 63, CTR 62, and XER 64 are included in the ABI, but SPR save and restore registers SRR0 52, SRR1 53, CSRR0 54, CSRR1 55, DSRR0 56, and DSRR1 57 are not included in the ABI. However, in an alternate embodiment, the SPR save and restore registers may be included in the ABI.

When an interrupt is received within processor 12, the current state of the processor needs to be saved prior to handling the interrupt so that the current state can be restored upon returning from interrupt. In order to properly save the current state of processor 12, it is desirable to store the contents of some or all of the GPRs and SPRs described above to a stack or other storage area (optionally referred to as heap or program stack or program heap). Note that the stack (which is used during program execution, as known in the art) can be located in any memory within or coupled to processor 12. For example, all or a portion of memory 14 may be used to implement the stack, where a storage location within processor 12, stores the value of the stack pointer. For example, according to the ABI of processor 12, GPR r1 stores the value of the stack pointer, where the stack pointer points to the top of the stack within memory 14 (as indicated by stack pointer 44 in FIG. 1), where values are loaded from the top of the stack, and values are stored to the top of the stack. That is, the stack typically operates as a first-in last-out structure, where items are stored to or loaded from the top of the stack, as indicated by the stack pointer.

Although it may be desirable to store some or all of the GPRs and SPRs, it may not be necessary to store the contents of all of the registers. That is, it may be desirable to store only a subset of the GPRs and/or the SPRs. For example, in one case, it may be desirable to only store and restore the subset of GPRs which are volatile GPRs. In the example of FIG. 4, the ABI used herein defines GPRs r0 and r3-r12 as volatile registers. Note also that r0 and r3-r12 represent a non-contiguous subset of the GPRs. That is, this subset does not include r1 and r2. Alternatively, it may be desirable to store other non-contiguous subsets of the GPRs. Similarly, it may be desirable to store only a subset of SPRs, which may be contiguous or non-contiguous. For example, in one embodiment, it may be desirable to store some or all of the user mode SPRs (i.e. those SPRs that are defined as part of the user mode's programmer's model, such as in FIG. 3). For example, it may be desirable to store CR 61, LR 63, CTR 62, and XER 64. Therefore, note that the registers (including both GPRs and SPRs) defined by the ABI for processor 12 may include both volatile and non-volatile registers, where the set of volatile registers and/or the set of non-volatile registers may be non-contiguous registers. It may be desirable to store some or all of the set of volatile registers defined by the ABI.

Typically, in current systems known today, if a non-contiguous subset of registers is to be stored, it is necessary to individually store the contents of each register to the stack with a separate store instruction, and then to similarly individually load the contents from the stack back into the registers with separate load instructions. However, this requires a tremendous amount of overhead and time, because a large number of instructions is needed. For example, to simply store and restore the set of volatile GPRs r0 and r3-r12 requires 11 store instructions to store and 11 load instructions to restore. Typically, the contents of other SPRs must also be saved, and must also be done on an individual register basis, which further increases the number of instructions required to properly save and restore the processor state. In the case of SPRs, a pair of instructions is typically required to save each SPR (a first instruction to move the contents of the SPR into a GPR, such as r0, and a second instruction to move the contents of r0 to the stack). This increased number of instructions results in increased interrupt latency, thus negatively impacting system performance. Furthermore, interrupts may have to be disabled while performing the stacking sequence of instructions so as not to lose processor state information. However, if interrupts are disabled during such a lengthy stream of instructions, higher priority interrupts may be missed or delayed.

In another system known today, which includes only 16 GPRs and uses 32-bit instructions, a 32-bit instruction format is used to include both a 16-bit instruction portion and a 16-bit mask value in order to store contents of the GPRs to the stack. The 16-bit instruction portion can identify the type of instruction (e.g. a load or a store), and each bit of the 16-bit mask value corresponds to one of the 16 GPRs so that the mask value can be used to individually select any number of the 16 GPRs. However, as technology advances and processors become more complex, the number of GPRs within a system increases. For example, this 32-bit instruction would not work for a system which includes more than 16 GPRs. That is, in many systems, such as that illustrated in FIG. 1, it is typically not feasible to have an instruction format which provides enough bits to allocate a bit for every GPR that could be saved. For example, there may not be an "extra" 32 bits in the instruction format to allow for a single instruction to uniquely identify each of the 32 GPRs. Furthermore, this type of mask value does not take into consideration any of the SPRs, where separate instructions, as described in the previous paragraph, would then be needed for each SPR to be saved and restored. Also, if too many registers are selected by the mask value, the execution of this instruction may be too long, and thus higher priority interrupts again may be missed or delayed.

In yet another system known today, a store or load instruction is defined which includes a "first" field which identifies a first GPR, where all the GPRs starting from that GPR are stored or loaded. In another system known today, the instruction includes both a "first" and a "last" field which identifies both a starting and ending GPR where the starting GPR through the ending GPR are stored or loaded. However, in either of these systems, only contiguous subsets of GPRs can be stored or loaded with any single instruction. That is, each time there is a break in the GPRs that is to be stored or loaded (such as within a set of non-contiguous GPRs), either all registers in the "break" would have to be stored or loaded (wasting both time and space) or a separate instruction would be needed to address each contiguous section within the set of non-contiguous GPR. If one or more registers in a contiguous list of registers is "dedicated" to a particular function or purpose, then it may also be undesirable or harmful to restore these register values after an interrupt is handled, since the original saved values may not be the proper values to be restored. Thus, for one or more of these various reasons, using a contiguous list of registers for loading or storing may not be possible. Also, as in the previous case, these instructions make no provisions for the storing or loading of SPRs. That is, none of the instructions described above with respect to the known systems allow for the storing or loading of multiple SPRs.

In one embodiment of the current invention, a single instruction can be used to store or load a subset of registers (including either GPRs, SPRs, or both), where the subset may also be non-contiguous. Furthermore, the single instruction can do so without the use of a mask or mask value within the instruction or stored elsewhere. That is, the subset of registers can be specified by the single instruction with a maskless process. In one embodiment, five different store instructions are defined and five different load instructions are defined which may allow for improved interrupt latency. Also, in one embodiment, each of the five store instructions and five load instructions discussed herein are 32-bit instructions.

With respect to the store instructions, a first store instruction (an "stmvgprw" instruction) is used to store the subset of volatile GPRs as defined by the ABI. For example, in one embodiment, this first instruction stores the non-contiguous subset including GPRs r0 and r3-r12 to the stack. Note that the "w" at the end of the instruction refers to the size "word" where words are stored. However, this first store instruction can also be an "stmvgprd" instruction where double words are stored. Alternatively, other sizes may be defined. A second store instruction (an "stmvsprw" instruction) is used to store a subset of user mode SPRs, which may include both volatile and non-volatile portions. For example, in one embodiment, this second store instruction stores user mode SPRs CR 61, LR 63, CTR 62, and XER 64 to the stack. A third store instruction (an "stmsrrw" instruction) is used to store a subset of supervisor mode SPRs, such as, for example, the save and restore registers SRR0 52 and SRR1 53. A fourth store instruction (an "stmcsrrw" instruction) is used to store another subset of supervisor mode SPRs, such as, for example, the critical save and restore registers CSSR0 54 and CSSR1 55. A fifth store instruction (an "stmdsrrw" instruction) is used to store yet another subset of supervisor mode SPRs, such as, for example, the debug save and restore registers DSSR0 56 and DSSR1 57. Again, the "w" at the end of any of these instructions refers to the size "word," however, the instructions may refer to other sizes, too.

With respect to the load instructions, a first load instruction (an "lmvgprw" instruction) is used to load values from the stack into the subset of volatile GPRs as defined by the ABI. For example, in one embodiment, this first instruction loads the non-contiguous subset, including GPRs r0 and r3-r12, from the stack. Note that the "w" at the end of the instruction refers to the size "word" where words are loaded. However, this first load instruction can also be an "lmvgprd" instruction where double words are loaded. Alternatively, other sizes may be defined. A second load instruction (an "lmvsprw" instruction) is used to load from the stack a subset of user mode SPRs, which may include both volatile and non-volatile portions. For example, in one embodiment, this second load instruction loads user mode SPRs CR 61, LR 63, CTR 62, and XER 64 from the stack. A third load instruction (an "lmsrrw" instruction) is used to load from the stack a subset of supervisor mode SPRs, such as, for example, the save and restore registers SRR0 52 and SRR1 53. A fourth load instruction (an "lmcsrrw" instruction) is used to load from the stack another subset of supervisor mode SPRs, such as, for example, the critical save and restore registers CSSR0 54 and CSSR1 55. A fifth load instruction (an "lmdsrrw" instruction) is used to load from the stack yet another subset of supervisor mode SPRs, such as, for example, the debug save and restore registers DSSR0 56 and DSSR1 57. Again, the "w" at the end of any of these instructions refers to the size "word," however, the instructions may refer to other sizes, too.

Therefore, note that each of the store or load instructions can be categorized into three different types of instructions: a first type which loads a non-contiguous subset of GPRs without the use of a mask value (such as stmvgprw and lmvgprw), a second type which loads two or more user mode SPRs (such as stmvsprw and lmvsprw), and a third type which loads two or more supervisor mode SPRs (such as stmsrrw, stmcsrrw, stmdsrrw, lmsrrw, lmcsrrw, and lmdsrrw). In one embodiment, note that the first and second type of instructions can be executed when processor 12 is in user or supervisor mode, while the third type of instruction can be executed only when processor 12 is in supervisor mode. Note that each of these 10 single instructions are used to load or store multiple registers, where these registers may be non-contiguous according to the programmer's model. Note that in alternate embodiments, other single instructions may be defined which load different subsets of registers from the stack in addition to or instead of those described above.

Also, in one embodiment, note that each of these instructions may be defined as either an interruptible instruction or a non-interruptible instruction. For example, in one embodiment, the third type of instructions (such as stmsrrw, stmcsrrw, stmdsrrw, lmsrrw, lmcsrrw, and lmdsrrw) may be implemented as non-interruptible instructions where interrupts are disabled during the execution of each of these instructions. However, the first and second type of instructions (such as stmvgprw, lmvgprw, stmvsprw and lmvsprw) may be implemented as interruptible instructions where interrupts are not disabled during the execution of each of these instructions. In this manner, interrupts are only disabled for a portion of the time that the state of the processor is being stored or restored, such that higher priority interrupts have a greater opportunity to be serviced and not be delayed or missed.

Furthermore, as will be seen in reference to the code segment illustrated in FIG. 5, the use of these type of instructions which allow for the storing and loading of multiple registers may allow for reduced interrupt latency by using a smaller number of instructions (e.g. 3-5 instructions) to store the necessary state as opposed to, e.g., twenty plus instructions. For example, to store or load each of the registers which are stored or loaded by the 5 store or load instructions discussed above by using instructions which only allow the storing or loading of a single register at a time (as was discussed above with respect to the first known system), about 31 instructions would be needed rather than 5.

For example, referring to FIG. 5, a code segment is illustrated which first stores a number of GPRs and SPRs to the stack. The first instruction is an stmsrrw[u] instruction which stores the contents of both SRR0 52 and SRR1 53 to the stack. In the illustrated example, note that this stmsrrw[u] instruction is non-interruptible such that interrupts are not recognized during execution of this instruction. The "[u]" following the instructions indicates that the stack pointer is to be updated upon executing the instruction. Therefore, each instruction can be executed with or without an update of the stack pointer, where the absence of the [u] indicates that no update of the stack pointer is performed. That is, each instruction can include a field to optionally update the stack pointer. Still referring to the first instruction in the code segment, the "−8(r1)" indicates that the contents of SRR0 52 and SRR1 53 are each stored to the top of the stack (i.e. pushed onto the stack), and the stack pointer is decremented by 8 which allows the stack pointer to now point to the new top of stack (which stores the contents SRR1 53). Due to the "[u]", the value of the stack pointer in r1 is updated with "r1−8." The value of "8" is used because the contents of SRR0 52 and SRR1 53 require 8 bytes of storage space (i.e. two words) on the stack; therefore, the stack pointer is decremented by 8. Also, in the current embodiment, the stack is implemented from a higher address to a lower address such that the top of the stack is at a lower address value than the bottom of the stack. That is, as items are stored to the top of the stack, the stack pointer is decremented to advance the stack pointer to continue to point to the top of the stack.

The next instruction in the code segment of FIG. 5 is an stmvgprw[u] instruction which stores the contents of the subset of volatile GPR registers, where the subset of volatile GPRs are defined by the ABI. In the example ABI register definition of FIG. 4, the volatile GPRs are r0 and r3-r12 (which is a non-contiguous subset of the GPRs); therefore, the stmvgprw[u] instruction in the code segment of FIG. 5 stores GPRs r0 and r3-r12 to the stack. Again, the "[u]" following the instructions indicates that the stack pointer is to be updated upon executing the instruction. The "−44(r1)" indicates that the contents of r0 and r3-r12 (in that order) are each stored to the top of the stack (i.e. pushed onto the stack), and the stack pointer is then decremented by 44 which allows the stack pointer to now point to the new top of stack (which stores the contents r12). Due to the "[u]", the value of the stack pointer in r1 is updated with "r1−44." The value of "44" is used because the contents of r0 and r3-r12 require 44 bytes of storage space on the stack (where each register requires 4 bytes, and there are 11 registers total being stored with this instruction).

The next instruction in the code segment of FIG. 5 is an stmvsprw[u] instruction which stores the contents of a subset of volatile user mode SPRs to the stack, where the subset, in the illustrated embodiment, includes the SPRs CR 61, LR 63, CTR 62, and XER 64. Again, the "[u]" following the instructions indicates that the stack pointer is to be updated upon executing the instruction. The "−16(r1)" indicates that the contents of CR 61, LR 63, CTR 62, and XER 64 are each stored to the top of the stack (i.e. pushed onto the stack), and the stack pointer is then decremented by 16 which allows the stack pointer to now point to the new top of stack. Due to the "[u]", the value of the stack pointer in r1 is updated with "r1−16." The value of "16" is used because the contents of CR 61, LR 63, CTR 62, and XER 64 require 16 bytes of storage space on the stack (where each register requires 4 bytes, and there are 4 registers total being stored with this instruction). Therefore, note that less than three instructions (e.g. the stmvgprw and the stmvsprw instructions) can collectively store all of the set of non-contiguous volatile registers determined by the ABI (e.g. those registers indicated as volatile by the ABI of FIG. 4).

At this point, interrupt handling can occur, where the state of processor 12 has been properly saved. In one embodiment, the stmsrrw[u] instruction is non-interruptible while the stmvgprw[u] and the stmvsprw[u] instructions are. In this manner, a higher priority interrupt can be handled during the execution of the stmvgprw[u] and the stmvsprw[u] instructions, and will thus only be delayed or missed during execution of the stmsrrw[u] instruction. Note that if all of the registers (16 registers) stored by the three store instructions illustrated in the code segment of FIG. 5 are stored with a single instruction, interrupts would likely need to be disabled during the execution of this single instruction to ensure proper operation. However, this single instruction which stores the contents of 16 registers would take longer to execute than each of the three store instructions of FIG. 5, and thus higher priority interrupts would more likely be missed or delayed. Therefore, the use of the three instructions to store subsets (including non-contiguous subsets) of registers (GPRs or SPRs), where some of these instructions may be interruptible, may provide for improved interrupt handling by allowing for interrupts to be enabled for a larger amount of time during the processor state saving stage. Furthermore, the use of these three instructions may allow for reduced interrupt latency by removing the excess overhead that would result from executing a separate store instruction for each GPR and a pair of separate instructions for each SPR. That is, in the illustrated example of FIG. 5, only 3 instructions can be used rather than 23 instructions which would typically be required if each register stored by the 3 store instructions were stored individually.

Note that the code segment of FIG. 5 illustrates only three store instructions; however, in an alternate embodiment, other instructions, such as the stmcsrrw and the stmdsrrw instructions may also be present for a total of 5 instructions if it is also necessary to store SPRs DSSR0 56, DSSR0 57, CSSR0 54, and CSSR1 55. Alternatively, any combination of these five instructions can be used, as needed, to provide for proper state saving for interrupt handling.

The code segment of FIG. 5 also illustrates three load instructions used to restore the previously saved register contents from the stack. The first load instruction is the lmvsprw instruction which loads from the top of the stack, the contents of user mode SPRs XER 64, CTR 62, LR 63, and CR 61 back into their corresponding registers. That is, since the content of these registers were the last ones pushed or stored to the top of the stack, they are the first to be popped from or loaded from the top of the stack. The stack pointer did not need to be updated or changed prior to performing the load, because the stack pointer was already pointing to the top of the stack. Therefore, there is no immediate value preceding "(r1)," and there is no "[u]" following the instruction.

The next load instruction is the lmvgprw[u] instruction which loads the contents of the non-contiguous subset of volatile GPRs from the stack back into their registers. Note that the GPRs are loaded in the reverse order (r12-r3 and r0) from the stack into the corresponding registers since r12 was the last of the GPRs to be stored to the top of the stack with the store instruction. In this case, the stack pointer is first incremented by 16 bytes prior to loading the register contents, as indicated by the "16(r1)," in order to point to the new top of the stack. That is, the pointer is incremented by 16 to account for the 16 bytes that were popped off of the stack in transferring the contents of the previous 4-byte each XER 64, CTR 62, LR 63, and CR 61 registers. The stack pointer is therefore updated to r1=r1+16. Therefore, note that less than three instructions (e.g. the lmvgprw and the lmvsprw instructions) can collectively load all of the set of non-contiguous volatile registers determined by the ABI (e.g. those registers indicated as volatile by the ABI of FIG. 4).

The next load instruction is the lmsrrw[u] instruction which loads the contents of the supervisor mode SPRs SRR1 53 and SRR0 52 from the stack into their corresponding registers. Note that the contents of these registers were the first pushed onto the stack with the store instructions and are thus the last to be popped from the stack to restore the processor state upon returning from the interrupt. In this case, the stack pointer value is first incremented by 44 bytes prior to loading the register contents, as indicated by the "44(r1)," in order to point to the new top of the stack. That is, the pointer is incremented by 44 to account for the 44 bytes that were popped off of the stack in transferring the contents of the previous 11 4-byte each GPRs (r12-r3 and r0). The stack pointer is therefore updated to r1=r1+44.

The next instruction is an add immediate (addi) instruction which adds 8 to the contents of r1 (which is the stack pointer). Since the previous instruction popped 8 bytes of information off of the stack, the stack pointer needs to be incremented by 8 in order to point to the new top of the stack (i.e. to the element on the stack that follows the removed SRR0 52 value).

Other load instructions, such as the lmdsrrw and lmcsrrw instructions may also be present, if the contents of those registers were previously stored with the store instructions. Therefore, the load instructions can be used to restore those values that were pushed onto the stack by the store instructions. As with the store instructions, in one embodiment, the lmsrrw instruction is not interruptible while the lmvsprw and the lmsrrw instructions are interruptible. Therefore, with the reduced overhead allowed by the reduced number of instructions useful in restoring the state processor 12 and with the ability for some of these load instructions being interruptible, interrupt latency can be reduced while still addressing higher interrupt priorities.

By now it should be appreciated that there has been provided various store and load instruction types which allow for the saving and restoring of various subsets of multiple GPRs and/or SPRs, where these subsets may include non-contiguous registers. Note that these store and load instructions are able to address the storing and loading of SPRs as well as GPRs (or a combination of both SPRs and GPRs) and of non-contiguous subsets of GPRs and/or SPRs, all without the need of a mask value within the instruction or specified elsewhere. That is, note that the subsets of GPRs and/or SPRs can be specified by these store and load instructions in a maskless process. These instructions may be useful in saving and restoring the state of a processor such as when an interrupt is received and needs to be serviced. The use of these instructions may allow for reduced interrupt latency by, for example, removing the excess latency introduced by using one or more separate instructions for each and every GPR and SPR that needs to be saved and restored. Furthermore, the ability to make some of these instructions interruptible while others non-interruptible may improve flexibility in dealing with the acknowledgment of higher priority interrupts which can occur during the saving or restoring of the processor state.

In one embodiment, a method includes providing an application binary interface, where the application binary interface determines a set of non-contiguous volatile registers and a set of non-volatile registers, and where the set of non-contiguous volatile registers comprises a plurality of general purpose registers and a plurality of special purpose registers, and providing less than three instructions which collectively load or store all of the set of non-contiguous volatile registers determined by the application binary interface.

In a further embodiment, the load is from a stack and the store is to the stack.

In another further embodiment, the less than three instructions comprises a first instruction for loading or storing at least one of the plurality of special purpose registers. In yet a further embodiment, the first instruction is executable when the data processing system is in either a supervisor mode or a user mode. In another yet further embodiment, the first instruction comprises a field to optionally update a stack pointer.

In another further embodiment, the less than three instructions comprises a first instruction for loading or storing all non-contiguous volatile general purpose registers within the set of non-contiguous volatile registers.

In another embodiment, a method for operating a data processing system includes providing a plurality of registers r0, r1, ... rN, wherein the plurality of registers are contiguous in the programmer's model, providing an instruction, and during execution of the instruction, loading or storing a subset of the plurality of registers, where the subset of the plurality of registers is non-contiguous and where which of the plurality of registers are part of the subset of the plurality of registers is specified in a maskless process.

In a further embodiment of the another embodiment, the instruction comprises 32 bits and the plurality of registers comprises at least 32 registers.

In another further embodiment of the another embodiment, the subset of the plurality of registers comprise volatile registers. In yet a further embodiment, the volatile registers are defined as volatile by an application binary interface.

In another further embodiment of the another embodiment, the subset of the plurality of registers comprises general purpose registers r0 and r3-r12.

In another further embodiment of the another embodiment, the instruction is interruptible.

In another further embodiment of the another embodiment, the loading is from a stack and the storing is to the stack.

In another further embodiment of the another embodiment, the instruction comprises a field to optionally update a stack pointer.

In yet another embodiment, a data processing system includes a set of volatile registers comprising a plurality of volatile general purpose registers, a plurality of volatile supervisor special purpose registers, and a plurality of volatile user special purpose registers, and execution circuitry for executing a first instruction that loads or stores the plurality of supervisor special purpose registers, for executing a second instruction that loads or stores the plurality of volatile general purpose registers, and for executing a third instruction that loads or stores the plurality of volatile user special purpose registers.

In yet another embodiment, a method for operating a data processing system includes providing an application binary interface, where the application binary interface determines a set of volatile registers and a set of non-volatile registers, and where the set of volatile registers comprises a plurality of non-contiguous volatile general purpose registers, and providing a first instruction for storing the plurality of non-contiguous volatile general purpose registers.

In yet another embodiment, a method for operating a data processing system includes providing a plurality of special purpose registers, providing an instruction, and during execution of the instruction, loading or storing a subset of the plurality of special purpose registers, where which of the plurality of special purpose registers are part of the subset of the plurality of special purpose registers is specified in a maskless process. In a further embodiment of this another embodiment, the plurality of special purpose registers is accessible only in supervisor mode. In another further embodiment of this another embodiment, the plurality of special purpose registers is accessible in supervisor mode and in user mode. In another further embodiment of this another embodiment, the instruction is interruptible. In another further embodiment of this another embodiment, at least one of the plurality of special purpose registers stores information from a program counter register.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of may different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. Also for example, system 10 or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operations may be distributed in additional operations. Moreover, alternative embodiments may include multiple instances of a particular operation, and the order of operations may be altered in various other embodiments.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The term "plurality", as used herein, is defined as two or more than two. The term another, as used herein, is defined as at least a second or more.

The term "coupled", as used herein, is defined as connected, although not necessarily directly, and not necessarily mechanically.

Because the above detailed description is exemplary, when "one embodiment" is described, it is an exemplary embodiment. Accordingly, the use of the word "one" in this context is not intended to indicate that one and only one embodiment may have a described feature. Rather, many other embodiments may, and often do, have the described feature of the exemplary "one embodiment." Thus, as used above, when the invention is described in the context of one embodiment, that one embodiment is one of many possible embodiments of the invention.

Notwithstanding the above caveat regarding the use of the words "one embodiment" in the detailed description, it will be understood by those within the art that if a specific number of an introduced claim element is intended in the below claims, such an intent will be explicitly recited in the claim, and in the absence of such recitation no such limitation is present or intended. For example, in the claims below, when a claim element is described as having "one" feature, it is intended that the element be limited to one and only one of the feature described.

Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

What is claimed is:

1. A method for operating a data processing system, the method comprising:
providing a set of non-contiguous volatile registers of the data processing system and a set of non-volatile registers of the data processing system, wherein each set is determined by an application binary interface, and wherein the set of non-contiguous volatile registers comprises a plurality of general purpose registers and a plurality of special purpose registers; and providing less than three single instructions which, when executed by execution circuitry, collectively load or store all of the set of non-contiguous volatile registers determined by the application binary interface, wherein the set of non-contiguous volatile registers includes every volatile register defined by the application binary interface, wherein the collectively loading or storing of all of the set of non-contiguous volatile registers is performed in less than 3 single units of instruction execution.

2. A method as in claim 1, wherein the load is from a stack and the store is to the stack.

3. A method as in claim 1, wherein the less than three instructions comprises a first instruction for loading or storing at least one of the plurality of special purpose registers.

4. A method as in claim 3, wherein the first instruction is executable when the data processing system is in either a supervisor mode or a user mode.

5. A method as in claim 1, wherein the less than three instructions comprises a first instruction for loading or storing all non-contiguous volatile general purpose registers within the set of non-contiguous volatile registers.

6. A method as in claim 3, wherein the first instruction comprises a field to optionally update a stack pointer.

7. A method for operating a data processing system, the method comprising:

providing a plurality of registers r0, r1, . . . rN, wherein the plurality of registers are contiguous in a programmer's model corresponding to the data processing system;

providing a single instruction; and executing the single instruction by execution circuitry, the executing the single instruction results in loading or storing a subset of the plurality of registers, wherein the loading or storing of the subset of the plurality of registers is performed in a single unit of instruction execution, wherein the subset of the plurality of registers is non-contiguous and includes every volatile general purpose register defined by an application binary interface;

and wherein which registers of the plurality of registers are part of the subset of the plurality of registers is specified in a maskless process.

8. A method as in claim 7, wherein the single instruction comprises 32 bits and the plurality of registers comprises at least 32 registers.

9. A method as in claim 7, wherein the subset of the plurality of registers comprises general purpose registers r0 and r3-r12.

10. A method as in claim 7, wherein the single instruction is interruptible.

11. A method as in claim 7, wherein the loading is from a stack and the storing is to the stack.

12. A method as in claim 7, wherein the single instruction comprises a field to optionally update a stack pointer.

13. A data processing system implemented at least partially in hardware, comprising:

a set of volatile registers comprising a plurality of volatile general purpose registers, a plurality of volatile supervisor special purpose registers, and a plurality of volatile user special purpose registers; and execution circuitry for executing a first single instruction that loads or stores the plurality of supervisor special purpose registers, for executing a second single instruction that loads or stores the plurality of volatile general purpose registers, and for executing a third single instruction that loads or stores the plurality of volatile user special purpose registers, wherein:

the loading or storing the plurality of supervisor special purpose registers is performed in a single unit of instruction execution of the first single instruction, the loading or storing the plurality of volatile general purpose registers is performed in a single unit of instruction execution of the second single instruction, and the loading or storing of the plurality of volatile user special purpose registers is performed in a single unit of instruction execution of the third single instruction.

14. A method for operating a data processing system, the method comprising:

providing a set of volatile registers and a set of non-volatile registers, wherein each set is determined by an application binary interface, and wherein the set of volatile registers comprises a plurality of non-contiguous volatile general purpose registers; and providing a first single instruction to execution circuitry which, when executed, stores the plurality of non-contiguous volatile general purpose registers, wherein the plurality of non-contiguous volatile general purpose registers includes every volatile general purpose register defined by the application binary interface, wherein the storing of the plurality of non-contiguous volatile general purpose registers is performed in a single unit of instruction execution.

\* \* \* \* \*